United States Patent [19]
Johnsson

[11] 3,929,253
[45] Dec. 30, 1975

[54] METHOD OF ARRANGING A SEAL BETWEEN A PRESSURE VESSEL, PREFERABLY A REACTOR VESSEL, AND ITS LID BY MEANS OF A TORRID RING PROVIDED WITH FLANGES

[75] Inventor: Erik Börje Johnsson, Trosa, Sweden

[73] Assignee: Aktiebolaget Atomenergi, Sweden

[22] Filed: Apr. 18, 1973

[21] Appl. No.: 352,225

[30] Foreign Application Priority Data
May 26, 1972 Sweden.............................. 6989/72

[52] U.S. Cl. ............... 220/320; 220/240; 277/236; 285/13; 285/DIG. 18
[51] Int. Cl. ....................... B65d 53/00; B65d 45/00
[58] Field of Search ........ 220/46 MS, 55 R, 55 AN; 277/16–21, 236; 285/13, 14, 229, DIG. 18

[56] References Cited
UNITED STATES PATENTS

| | | | |
|---|---|---|---|
| 1,490,805 | 4/1924 | Divekey | 285/13 |
| 1,695,995 | 12/1928 | Coulston | 285/DIG. 18 |
| 2,786,704 | 3/1957 | Presdee et al. | 220/55 R |
| 2,821,325 | 1/1958 | Chapellier et al. | 220/46 MS |
| 3,007,600 | 11/1961 | Horner | 277/236 |
| 3,095,110 | 6/1963 | Pierce, Jr. | 220/46 MS |
| 3,353,859 | 11/1967 | Schupack | 220/55 R |
| 3,669,303 | 6/1972 | Launay | 220/46 MS |

FOREIGN PATENTS OR APPLICATIONS

| | | | |
|---|---|---|---|
| 963,387 | 7/1950 | France | 220/46 MS |
| 743,881 | 8/1954 | United Kingdom | 220/46 MS |

*Primary Examiner*—George E. Lowrance
*Assistant Examiner*—Joseph Man-Fu Moy
*Attorney, Agent, or Firm*—Toren, McGeady and Stanger

[57] ABSTRACT

There is provided a seal between a pressure vessel, in particular a vessel for a nuclear reactor, and its lid, which rests on a ledge in the vessel. A toroid ring with flanges is placed on top of the lid and a collar in the vessel. The inner flange is sealingly clamped against the lid by means of a ring with support legs of the lid, whereas the outer flange is clamped against the collar by means of displaceable clamps.

1 Claim, 1 Drawing Figure

U.S. Patent  Dec. 30, 1975  3,929,253
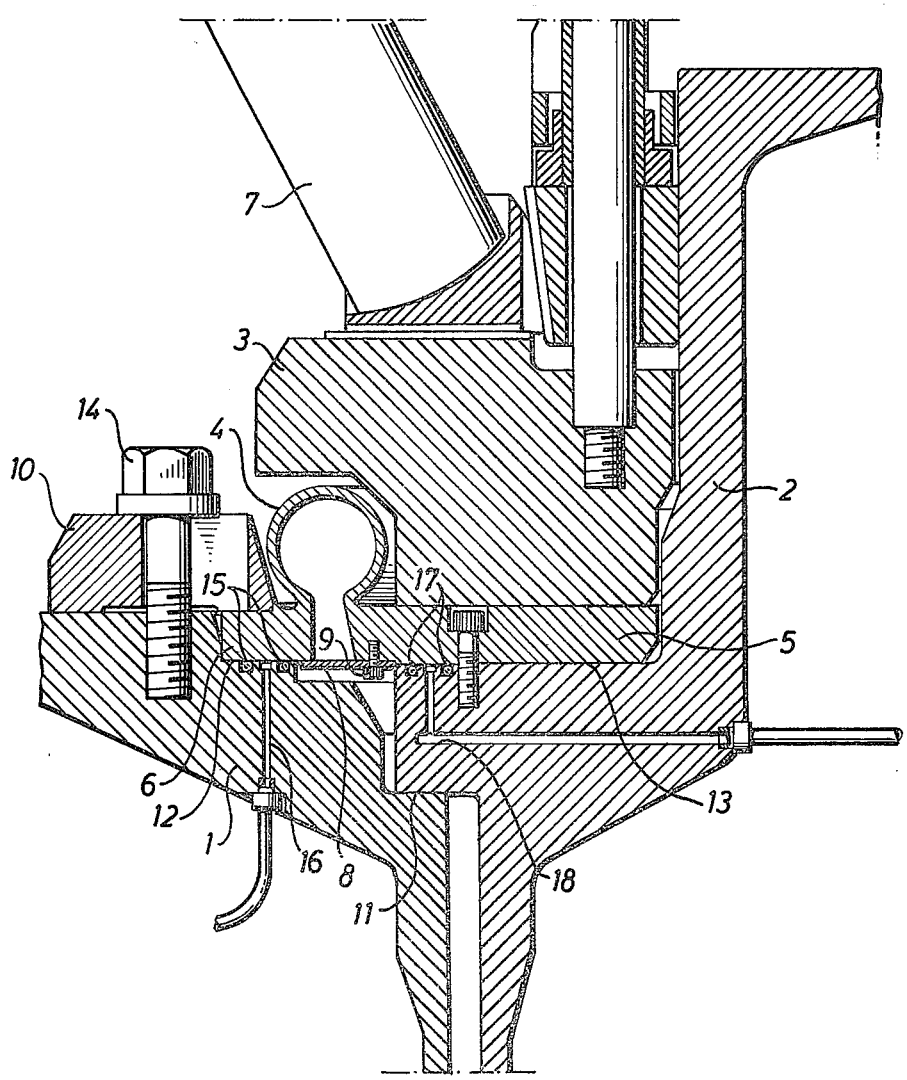

METHOD OF ARRANGING A SEAL BETWEEN A PRESSURE VESSEL, PREFERABLY A REACTOR VESSEL, AND ITS LID BY MEANS OF A TORRID RING PROVIDED WITH FLANGES

The present invention relates to a method of arranging a seal between a collar in a pressure vessel, particularly a reactor tank, and a shoulder on its lid resting on a ledge in the vessel, by means of a toroid ring provided with flanges.

In previously known installations of the type mentioned it is usual to weld the toroid to the vessel or the lid or to clamp the inner ring of the toroid between the lid and its support, and screw the outer flange of the toroid to the vessel.

In the latter case it is also usual to screw the inner flange to the lid.

The lower side of the toroid is directly in contact with an active environment milieu and it is therefore desirable to avoid manual manipulation, for instance of screws in this.

It is also desirable to be able to remove the seal without first having to lift the lid.

Furthermore, it is in general advisable to reduce the time required for manual manipulation connected with work at the edge of the lid to an absolute minimum.

These aims are fulfilled with the seal and the method of arranging the seal described in the accompanying claims according to which external and internal flanges, respectively, of the toroid ring are placed above the collar and the shoulder. The ring may also be provided with a plate spring applied over the inlet gap of the toroid as protection against leakage, the spring being attached to one flange. Above the inner flange of the toroid ring a support ring is placed for support legs belonging to the lid, so that the inner toroid flange is clamped against the shoulder of the lid when the support legs are adjusted. Finally, the outer toroid flange is clamped to the collar, preferably by means of radially displaceable clamps.

The plate spring constitutes an acceptable seal if the toroid is damaged, but does not prevent mutual relative movement of the toroid flanges.

Two concentric O-rings may be arranged below each toroid flange, between which rings there is a channel for evacuation of any active material which has leaked in or detection of a pressure increase caused by leakage.

The accompanying drawing shows an example of how a seal can be applied in accordance with the invention in the form of a toroid ring.

The drawing shows a pressure vessel 1, a lid 2 of the pressure vessel, a support ring 3 for the support legs 7 belonging to the lid and a toroid ring 4 with flanges 5 and 6.

The lid 2 rests on a ledge 11 in the vessel 1. The inner flange 5 of the toroid 4 rests on a shoulder 13 on the lid and the outer flange 6 rests on a collar 12 in the vessel 1. The support ring 3 rests on the upper side of the inner flange 5 and is clamped against this by the support legs 7. The outer flange 6 is clamped against the collar 12 by means of clamps 10 which can be disengaged from the outer flange by slightly unscrewing their attachment screws 14.

As a safety precaution, the toroid ring 4 has a plate spring 8 applied over its inlet gap. The spring 8 is attached at its inner edge to the inner flange 5 by means of screws 9 so that its free outer edge can be moved along the lower surface of the outer flange.

Two O-rings 15 are arranged between the outer flange 6 and the collar 12. A conduit 16 is arranged between the O-rings for evacuation or detection of active material leaking past the inner O-ring.

Similarly, two O-rings 17 and a conduit 18 are arranged between the inner flange 5 and the shoulder 13.

What is claimed is:

1. A sealing assembly for a pressure vessel including a vessel body having an open end and a lid engaging said vessel body completely about said end to form a preliminary seal for said vessel body, said sealing assembly comprising, in combination, a toroid ring member extending completely about said pressure vessel externally of said preliminary seal, said toroid ring member including integrally formed first and second flanges extending, respectively, radially inwardly and radially outwardly of said ring member, shoulder means formed about said lid and having said first annular flange in abutment therewith, collar means formed about said vessel body and having said second annular flange in abutment therewith, first connecting means releasably affixing said first annular flange against said shoulder means, and second connecting means releasably affixing said second annular flange against said collar means, said first connecting means comprising a support ring extending in abutting relationship about said first annular flange, with said first annular flange being positioned between said support ring and said shoulder means, and support legs extending to apply to said support ring a force clamping said first annular flange between said support ring and said shoulder means, said lid and said vessel body being so configured that the force applied by said support legs to clamp said first annular flange between said support ring and said shoulder means simultaneously operates to press said lid against said vessel body along the engaging portions thereof forming said preliminary seal, and said toroid ring member is formed with an arcuate portion thereof extending between and across a gap between said first and second annular flanges and wherein said assembly includes a spring plate attached to extend across said cap in abutment with both said first and second annular flanges.

* * * * *